(12) United States Patent
Lim et al.

(10) Patent No.: US 11,380,938 B2
(45) Date of Patent: Jul. 5, 2022

(54) METHOD OF MANUFACTURING ALL-SOLID-STATE BATTERY WITH STABLE INTERFACE OF LITHIUM ANODE

(71) Applicants: Hyundai Motor Company, Seoul (KR); Kia Motors Corporation, Seoul (KR)

(72) Inventors: Jae Min Lim, Suwon-si (KR); Sang Heon Lee, Yongin-si (KR); Yong Seok Choi, Seoul (KR); Yun Sung Kim, Seoul (KR); Hong Seok Min, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 674 days.

(21) Appl. No.: 16/402,075

(22) Filed: May 2, 2019

(65) Prior Publication Data
US 2020/0185778 A1   Jun. 11, 2020

(30) Foreign Application Priority Data
Dec. 10, 2018   (KR) .................. 10-2018-0158190

(51) Int. Cl.
*B23K 20/10* (2006.01)
*H01M 10/0585* (2010.01)
(Continued)

(52) U.S. Cl.
CPC ......... *H01M 10/0585* (2013.01); *B23K 20/10* (2013.01); *H01M 10/0525* (2013.01);
(Continued)

(58) Field of Classification Search
CPC .... B23K 20/04; B23K 20/26; B23K 2101/16; B23K 2103/04; B23K 20/10–106; B23K 20/12–1215; B21B 1/02; B21B 1/04; B21B 1/22; B21B 1/466; B21B 1/26; B21B 2001/028; B21B 2001/225; B21B 2001/383; B21D 39/03; B22D 11/142; B22D 11/16; B32B 15/011; B32B 2250/02; C21D 8/0205; C21D 8/0215; C21D 8/0226; C21D 9/561; C21D 9/562; C21D 9/60; B21C 47/22
(Continued)

(56) References Cited

U.S. PATENT DOCUMENTS

| 2006/0057433 A1* | 3/2006 | Ando | H01M 10/058 |
| | | | 429/231.95 |
| 2011/0052954 A1* | 3/2011 | Fujiwara | H01M 4/0411 |
| | | | 429/231.95 |

(Continued)

FOREIGN PATENT DOCUMENTS

KR    10-1900823 B1    9/2018
KR    10-2018-0104173 A    9/2019

*Primary Examiner* — Kiley S Stoner
(74) *Attorney, Agent, or Firm* — Fox Rothschild LLP

(57) ABSTRACT

A method of manufacturing an all-solid-state battery includes preparing a solid electrolyte layer, providing lithium metal to the solid electrolyte layer to prepare a stack, and radiating ultrasonic waves or sound waves to the stack. The method provides an all-solid-state battery with a stable interface between an anode formed of lithium metal and a solid electrolyte layer.

16 Claims, 6 Drawing Sheets

(51) Int. Cl.
  *H01M 10/0525* (2010.01)
  *H01M 10/0562* (2010.01)
  *B23K 103/08* (2006.01)
  *B23K 101/36* (2006.01)

(52) U.S. Cl.
  CPC ..... *H01M 10/0562* (2013.01); *B23K 2101/36* (2018.08); *B23K 2103/08* (2018.08); *H01M 2300/0068* (2013.01)

(58) Field of Classification Search
  USPC ............ 228/1.1, 110.1, 112.1–114.5, 2.1–2.3
  See application file for complete search history.

(56) References Cited

U.S. PATENT DOCUMENTS

| | | | |
|---|---|---|---|
| 2014/0045008 A1* | 2/2014 | Yan .................... | H01M 50/579 |
| | | | 429/89 |
| 2015/0255781 A1* | 9/2015 | Hashimoto ............ | H01G 11/86 |
| | | | 429/188 |
| 2017/0120505 A1* | 5/2017 | Nakano ............. | B29C 66/81429 |
| 2017/0305129 A1* | 10/2017 | Oorui .................... | B32B 15/08 |
| 2019/0237812 A1* | 8/2019 | Qiu ........................ | H01G 11/78 |
| 2019/0237813 A1* | 8/2019 | Qiu ........................ | H01M 4/139 |

\* cited by examiner

METHOD OF MANUFACTURING ALL-SOLID-STATE BATTERY WITH STABLE INTERFACE OF LITHIUM ANODE

CROSS-REFERENCE TO RELATED APPLICATION

This application claims under 35 U.S.C. § 119(a) the benefit of priority to Korean Patent Application No. 10-2018-0158190 filed on Dec. 10, 2018, the entire contents of which are incorporated herein by reference.

BACKGROUND

(a) Technical Field

The present disclosure relates to a method of manufacturing an all-solid-state battery with a stable interface between an anode formed of lithium metal and a solid electrolyte layer.

(b) Background Art

Lithium is an element which has the lowest oxidation-reduction potential of −3V among metal elements. Therefore, when lithium metal is used as an anode of a lithium secondary battery, a capacity per weight of about 3,860 mAh/g and a capacity per volume of about 2,060 mAh/cm$^3$ may be implemented and, thus, a lithium secondary battery having excellent energy density may be acquired.

However, lithium metal vigorously reacts with a liquid electrolyte of the lithium secondary battery and, thus, it is difficult to use lithium metal as an anode of the lithium secondary battery.

Korean Registered Patent No. 10-1900823 and Korean Patent Laid-open Publication No. 10-2018-0104173 discloses all-solid-state batteries.

SUMMARY OF THE DISCLOSURE

One aspect of the present invention provides a method of manufacturing an all-solid-state battery which may form a stable interface between an anode formed of lithium metal and a solid electrolyte layer while minimizing chemical reaction therebetween.

Another aspect of the present invention provides a method of manufacturing an all-solid-state battery, including preparing a solid electrolyte layer, providing lithium metal to the solid electrolyte layer to prepare a stack, and radiating ultrasonic waves or sound waves to the stack.

In an embodiment, the solid electrolyte layer may include a sulfide-based solid electrolyte.

In another embodiment, the method may further include providing a cathode to one surface of the solid electrolyte layer, prior to the providing the lithium metal.

In still another embodiment, in the providing the cathode, the cathode and the solid electrolyte layer may be stacked and then pressurized.

In yet another embodiment, the lithium metal may be a lithium foil.

In still yet another embodiment, in the radiating ultrasonic waves or sound waves to the stack, ultrasonic wave generators or sound wave generators may be provided at the outside of the stack and radiate the ultrasonic waves or the sound waves directly to the stack, without sealing or covering the stack with a separate base material.

In a further embodiment, the ultrasonic wave generators or the sound wave generators may be provided to the entirety or some regions of the outer surface of the stack.

In another further embodiment, in the radiating ultrasonic waves or sound waves to the stack, the stack may be inserted into a pouch and then the ultrasonic waves or the sound waves may be radiated to the stack.

In still another further embodiment, in the radiating ultrasonic waves or sound waves to the stack, the stack may be inserted into the pouch such that the entirety or some regions of the outer surface of the stack contact the inner surface of the pouch.

In yet another further embodiment, in the radiating ultrasonic waves or sound waves to the stack, ultrasonic wave generators or the sound wave generators may be provided at the outside of the pouch and radiate the ultrasonic waves or the sound waves to the stack.

In still yet another further embodiment, the ultrasonic wave generators or the sound wave generators may be provided to the entirety or some regions of the outer surface of the pouch.

In a still further embodiment, in the radiating the ultrasonic waves or the sound waves to the stack, the ultrasonic waves or the sound waves having a frequency of 20 kHz to 40 kHz may be radiated to the stack for 1 to 10 minutes.

In a yet still further embodiment, the radiating the ultrasonic waves or the sound waves to the stack may include radiating the ultrasonic waves or the sound waves to the stack for 10 to 30 seconds and pausing radiation of the ultrasonic waves or the sound waves to the stack for 10 to 30 seconds, and the radiating the ultrasonic waves or the sound waves to the stack and the pausing radiation of the ultrasonic waves or the sound waves to the stack may be repeated 5 to 10 times.

In another embodiment, in the radiating the ultrasonic waves or the sound waves to the stack, the ultrasonic waves or the sound waves may be radiated to the stack while pressurizing the stack at a pressure of 10 MPa to 200 MPa in a thickness direction of the stack.

In still another embodiment, in the radiating the ultrasonic waves or the sound waves to the stack, the ultrasonic waves or the sound waves may be radiated to the stack while maintaining the stack at a temperature of 25° C. to 100° C.

In yet another embodiment, the method may further include pressurizing the stack at a pressure of 10 MPa to 200 MPa in a thickness direction of the stack while maintaining the stack at a temperature of 25° C. to 100° C., after the radiating the ultrasonic waves or the sound waves to the stack.

Still another aspect of the invention provides a method of manufacturing an all-solid-state battery, comprising: providing a solid electrolyte layer with a cathode attached to a surface of the solid electrolyte; placing a lithium metal foil over another surface of the solid electrolyte layer to prepare a stack; and applying ultrasonic waves to the stack. In one embodiment, the stack is enveloped in a pouch, and the ultrasonic waves are applied to the pouch.

Other aspects and embodiments of the invention are discussed infra.

The above and other features of the invention are discussed infra.

BRIEF DESCRIPTION OF THE DRAWINGS

The above and other features of the present invention will now be described in detail with reference to embodiments thereof illustrated in the accompanying drawings which are given hereinbelow by way of illustration only, and thus are not limitative of the present invention, and wherein.

Figure 1:
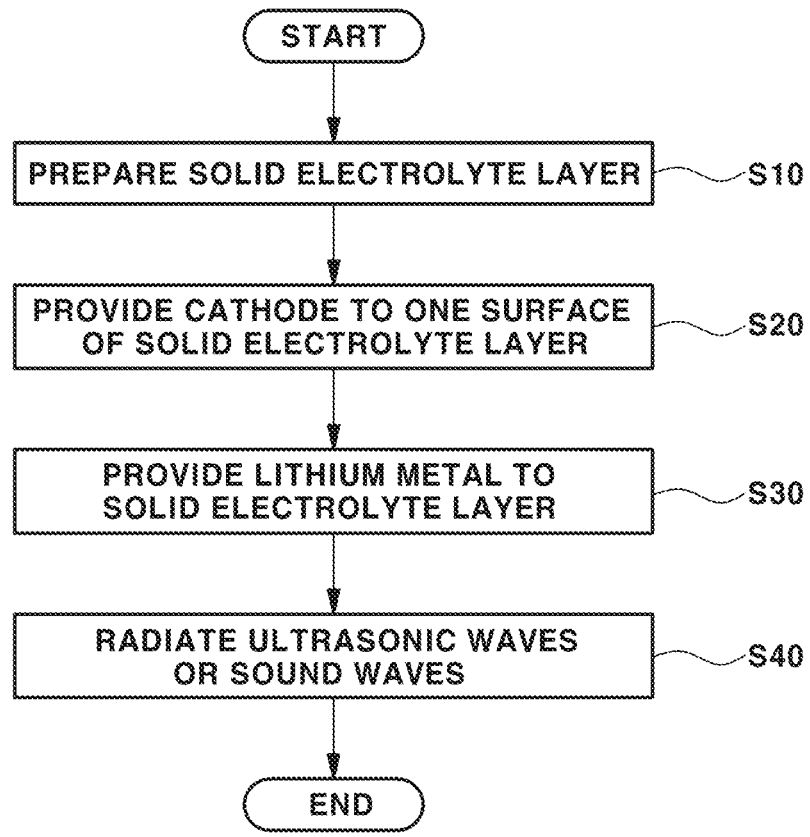
FIG. 1 is a flowchart schematically illustrating a method of manufacturing an all-solid-state battery in accordance with one embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the invention will be described in conjunction with embodiments, it will be understood that the present description is not intended to limit the invention to embodiments. On the contrary, the invention is intended to cover not only embodiments, but also various alternatives, modifications, equivalents and other embodiments within the spirit and scope of the invention as defined by the appended claims.

In the following description of the embodiments, terms, such as "including", "having", etc., will be interpreted as indicating presence of characteristics, numbers, steps, operations, elements or parts stated in the description or combinations thereof, and do not exclude presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing components, reaction conditions, polymer compositions and amounts of blends used in the description are approximations in which various uncertainties in measurement generated when these values are acquired from essentially different things are reflected and thus, it will be understood that they are modified by the term "about", unless stated otherwise. In addition, it will be understood that, if a numerical range is disclosed in the description, such a range includes all continuous values from a minimum value to a maximum value, unless stated otherwise. Further, if such a range refers to integers, the range includes all integers from a minimum integer to a maximum integer, unless stated otherwise.

An all-solid-state battery using a solid electrolyte instead of the liquid electrolyte (an electrolyte solution) fundamentally causes no reaction between the electrolyte solution and lithium metal and thus there is a strong possibility that lithium metal is used as an anode of the all-solid-state battery.

Further, in the all-solid-state battery, a solid electrolyte layer is formed and lithium metal having high ductility may be easily attached to the electrolyte layer by simply applying pressure thereto.

However, it is very difficult to uniformly bond lithium metal to the solid electrolyte layer. If an interface between the lithium metal and the solid electrolyte layer is not uniform, resistance increases and thus it is difficult to drive the all-solid-state battery, and dendrites are formed during charging and discharging and thus durability and efficiency are greatly lowered.

Vacuum heat deposition of lithium metal on one surface of a solid electrolyte layer may be used. However, such a deposition method may not be applied to manufacture of an all-solid-state battery having a large area. Further, the surface of the deposited lithium metal is not uniform and thus charging and discharging efficiency may be lowered.

A method of bonding lithium metal to one surface of a solid electrolyte layer and then heating and pressurizing the solid electrolyte layer provided with lithium metal may be used. However, such a heating and pressurizing method is suitable for a case that the solid electrolyte layer is an oxide-based solid electrolyte. A sulfide-based solid electrolyte has poor mechanical rigidity and is hazardous to chemical reaction, and thus, if lithium metal is attached to a solid electrolyte layer including a sulfide-based solid electrolyte by the heating and pressurizing method, a side reaction layer having high resistance may be formed by chemical reaction between the two components. Further, if an all-solid-state battery having a large area is manufactured, it is difficult to uniformly transmit heat and pressure.

FIG. 1 is a flowchart schematically illustrating a method of manufacturing an all-solid-state battery in accordance with one embodiment of the present invention. Referring to this figure, in embodiments, the all-solid-state battery manufacturing method includes preparing a solid electrolyte layer (Operation S10), attaching a cathode to one surface of the solid electrolyte layer (Operation S20), preparing a stack by attaching lithium metal to the solid electrolyte layer (Operation S30), and radiating ultrasonic waves or sound waves to the stack (Operation S40).

In preparing the solid electrolyte layer (Operation S10), the solid electrolyte layer may include a sulfide-based solid electrolyte. The sulfide solid electrolyte may be $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$S_2S_3$—LiI, $Li_2S$—$SiS_2$—$P_2S_5$—LiI, $Li_2S$—$B_2S_3$, $Li_2S$—$P_2S_5$—$Z_mS_n$ (m and n being positive numbers, and Z being one selected from the group consisting of Ge, Zn and Ga), $Li_2S$—$GeS_2$, $Li_2S$—$SiS_2$—$Li_3PO_4$, $Li_2S$—$SiS_2$-$Li_xMO_y$ (x and y being positive numbers, and M being one selected from the group consisting of P, Si, Ge, B, Al, Ga and In), or $Li_{10}GeP_2S_{12}$.

The solid electrolyte layer may be prepared by a wet process or a dry process.

A process of preparing the solid electrolyte layer by the wet process will be described as follows. In embodiments, slurry is prepared by dispersing the sulfide-based solid electrolyte in a solvent. The solid electrolyte layer is acquired by applying the slurry to a base material to a designated thickness and then drying the slurry.

A process of preparing the solid electrolyte layer by the dry process will be described as follows. In embodiments, a solid electrolyte layer is acquired by placing powder of the sulfide-based solid electrolyte into a mold having a designated shape and size and then pressurizing the powder at a designated pressure.

However, the process of preparing the solid electrolyte layer is not limited thereto and the solid electrolyte layer may be prepared by any method in which the solid electrolyte layer may maintain its thickness, shape, etc.

The solid electrolyte layer may further include a binder, as needed. The binder is not limited to a specific kind and content.

In providing the cathode (Operation S20), the cathode may be placed on one surface of the solid electrolyte layer and then be pressurized.

The cathode may include a cathode active material, a conductive material and a solid electrolyte.

The cathode active material is not limited to a specific kind. For example, the cathode active material may be an oxide active material or a sulfide active material.

The oxide active material may be a rock salt layer type active material, such as $LiCoO_2$, $LiMnO_2$, $LiNiO_2$, $LiVO_2$ or $Li_{1+x}Ni_{1/3}Co_{1/3}Mn_{1/3}O_2$, a spinel type active material, such as $LiMn_2O_4$ or $Li(Ni_{0.5}Mn_{1.5})O_4$, an inverse spinel type active material, such as $LiNiVO_4$ or $LiCoVO_4$, an olivine type active material, such as $LiFePO_4$, $LiMnPO_4$, $LiCoPO_4$ or $LiNiPO_4$, a silicon-containing active material, such as $Li_2FeSiO_4$ or $Li_2MnSiO_4$, a rock salt layer type active material, a part of a transition metal of which is substituted by a different kind of metal, such as $LiNi_{0.8}Co_{(0.2-x)}A_xO_2$ ($0<x<0.2$), a spinel type active material, a part of a transition metal of which is substituted by a different kind of metal, such as $Li_{1+x}Mn_{2-x-y}M_yO_4$ (M being at least one selected from the group consisting of Al, Mg, Co, Fe, Ni and Zn, and $0<x+y<2$), and lithium titanate, such as $Li_4Ti_5O_{12}$.

The sulfide active material may be copper Chevrel, iron sulfide, cobalt sulfide or nickel sulfide.

The conductive material forms an electron conducting path in the cathode. The conductive material may be an $SP^2$ carbon material, such as carbon black, conductive graphite, ethylene black or carbon nanotubes, or graphene.

The solid electrolyte may be equal to or different from the above-described sulfide-based solid electrolyte included in the solid electrolyte layer. For example, the solid electrolyte may be $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n being positive numbers, and Z being one selected from the group consisting of Ge, Zn and Ga), $Li_2S$—$GeS_2$, $Li_2S$—$SiS_2$—$Li_3PO_4$, $Li_2S$—$SiS_2$-$Li_xMO_y$ (x and y being positive numbers, and M being one selected from the group consisting of P, Si, Ge, B, Al, Ga and In), or $Li_{10}GeP_2S_{12}$.

The cathode may be prepared by a wet process or a dry process.

A process of preparing the cathode by the wet process will be described as follows. In embodiments, slurry is acquired by dispersing the cathode active material, the conductive material and the solid electrolyte in a solvent. The cathode is acquired by applying the slurry to a base material to a designated thickness and then drying the slurry. Here, a cathode current collector may be used as the base material.

A process of preparing the cathode by the dry process will be described as follows. In embodiments, a cathode is acquired by placing the cathode active material, the conductive material and the solid electrolyte into a mold having a designated shape and size and then pressurizing them at a designated pressure.

However, the process of preparing the cathode is not limited thereto and the cathode may be prepared by any method in which the cathode may maintain its thickness, shape, etc.

The cathode may be formed to have the same area as that of the solid electrolyte layer or have an area less than that of the solid electrolyte layer.

After the cathode is provided to one surface of the solid electrolyte layer, the cathode and the solid electrolyte layer are pressurized at a designated pressure for a designated time, thus being densified. Here, the cathode may include a cathode current collector attached thereto.

In preparing the stack by providing lithium metal to the solid electrolyte layer (Operation S30), the lithium metal is provided on the other surface of the solid electrolyte layer so that the solid electrolyte layer is located between the cathode and the lithium metal.

Figure 2:
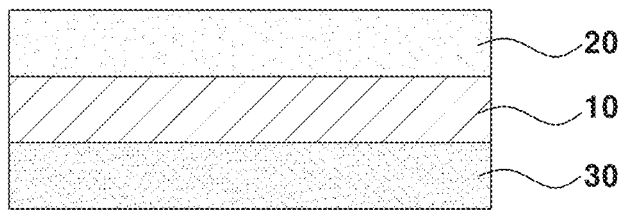
FIG. 2 is a cross-sectional view schematically illustrating a stack in accordance with one embodiment of the present invention.

FIG. 2 is a cross-sectional view schematically illustrating the stack. Referring to this figure, the stack includes a solid electrolyte layer 10, a cathode 20 provided on one surface of the solid electrolyte layer 10, and lithium metal 30 provided on the other surface of the solid electrolyte layer 10.

The lithium metal 30 may be a lithium foil. The lithium metal 30 is not limited to a specific thickness.

In radiating the ultrasonic waves or the sound waves to the stack (Operation S40), energy is transmitted to the lithium metal and the solid electrolyte layer of the stack through the ultrasonic waves or the sound waves to vibrate a floating interface between the lithium metal and the solid electrolyte layer formed in preparing the stack (Operation S30). Therefore, nonuniform parts of the floating interface are aligned and, thus, a flat interface between the lithium metal and the solid electrolyte layer is formed.

Here, when fluidity of the lithium metal is improved by controlling a frequency of the ultrasonic waves or the sound waves, an radiating time, temperature and pressure, a more excellent interface may be formed. The above conditions will be described later.

Figure 3:
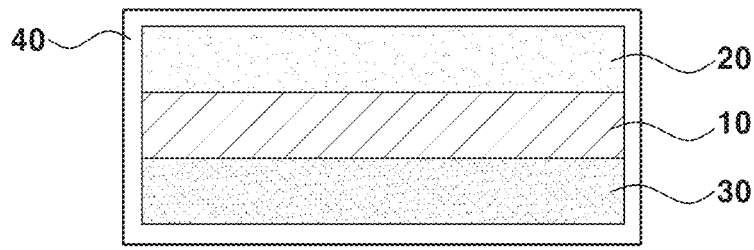
FIG. 3 is a cross-sectional view schematically illustrating one type of insertion of the stack into a pouch.
Figure 4:
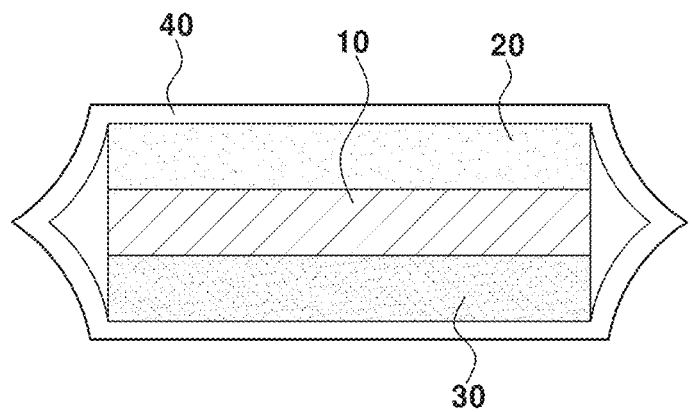
FIG. 4 is a cross-sectional view schematically illustrating another type of insertion of the stack into a pouch.

In radiating the ultrasonic waves or the sound waves to the stack (Operation S40), the ultrasonic waves or the sound waves may be radiated directly to the stack without sealing or covering the stack with a separate base material, or the ultrasonic waves or the sound waves may be radiated to the stack under the condition that the stack is inserted into a pouch. FIGS. 3 and 4 are cross-sectional views schematically illustrating insertion of the stack into a pouch.

If the ultrasonic waves or the sound waves are radiated directly to the stack, ultrasonic wave generators or sound wave generators may be provided at the outside of the stack and thus radiate the ultrasonic waves or the sound waves to the stack.

If the ultrasonic waves or the sound waves are radiated to the stack under the condition that the stack is inserted into a pouch, the entirety of the outer surface of the stack may contact the inner surface of the pouch, as shown in FIG. 3, or only some regions of the outer surface of the stack may contact the inner surface of the pouch, as shown in FIG. 4. However, energy may be more easily transmitted to the stack through the ultrasonic waves or the sound waves using the pouch of FIG. 3.

Figure 5:
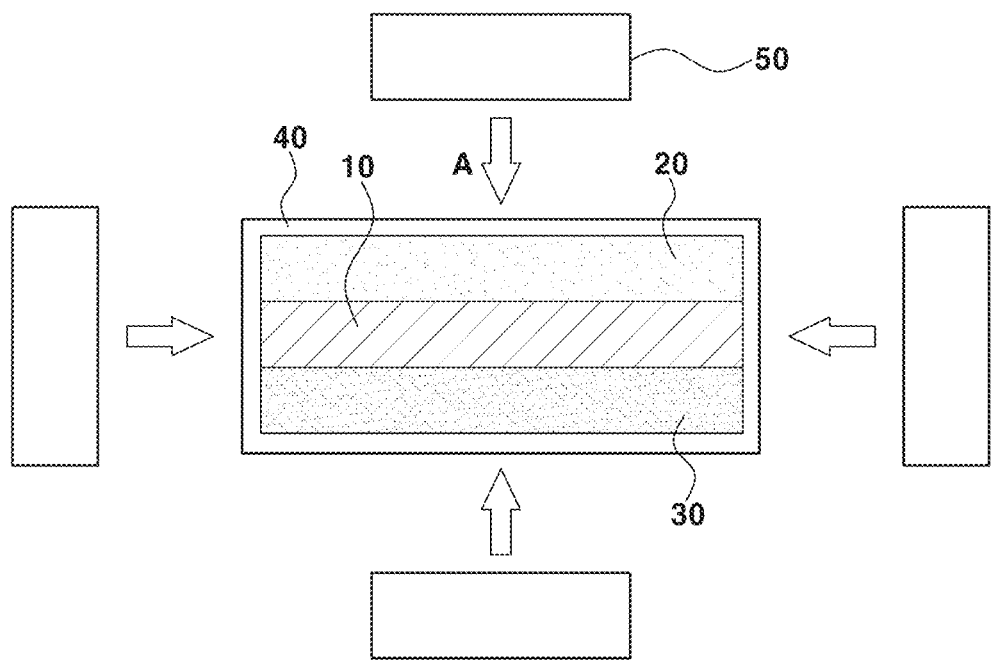
FIG. 5 is a reference view illustrating a method of radiating ultrasonic waves or sound waves to the stack.

FIG. 5 is a reference view illustrating a method of radiating ultrasonic waves or sound waves to the stack. Referring to this figure, ultrasonic wave generators or sound wave generators 50 may be provided at the outside of the pouch 40 to radiate ultrasonic waves or sound waves A to the stack.

The ultrasonic wave generators or the sound wave generators 50 may be provided to contact the pouch, or be provided to be spaced apart from the pouch by a sufficient distance to transmit the ultrasonic waves or the sound waves to the pouch.

Further, the ultrasonic wave generators or the sound wave generators 50 may be provided on the entirety or some regions of the outer surface of the pouch.

In order to omnidirectionally transmit the ultrasonic waves or the sound waves A to the stack, the ultrasonic wave generators or the sound wave generators 50 may be provided to contact the entirety of the outer surface of the pouch 40 to generate ultrasonic waves or sound waves.

In radiating the ultrasonic waves or the sound waves to the stack (Operation S40), the ultrasonic waves or the sound waves having a frequency of 20 kHz to 40 kHz may be radiated to the stack for 1 minute to 10 minutes.

In more detail, in radiating the ultrasonic waves or the sound waves to the stack (Operation S40), radiating the ultrasonic waves or the sound waves having a frequency of 20 kHz to 40 kHz to the stack for 10 seconds to 30 seconds and pausing radiation of the ultrasonic waves or the sound waves to the stack for 10 to 30 seconds may be repeated 5 to 10 times.

If pausing radiation of the ultrasonic waves or the sound waves to the stack is not performed, the temperature of the stack is excessively raised and a uniform interface between the lithium metal and the solid electrolyte layer may not be formed.

In one embodiment of the present invention, in radiating the ultrasonic waves or the sound waves to the stack (Operation S40), the stack may maintain a temperature of 25° C. to 100° C. and pressure of 10 MPa to 200 MPa may be applied to the stack in a thickness direction of the stack.

Figure 6:
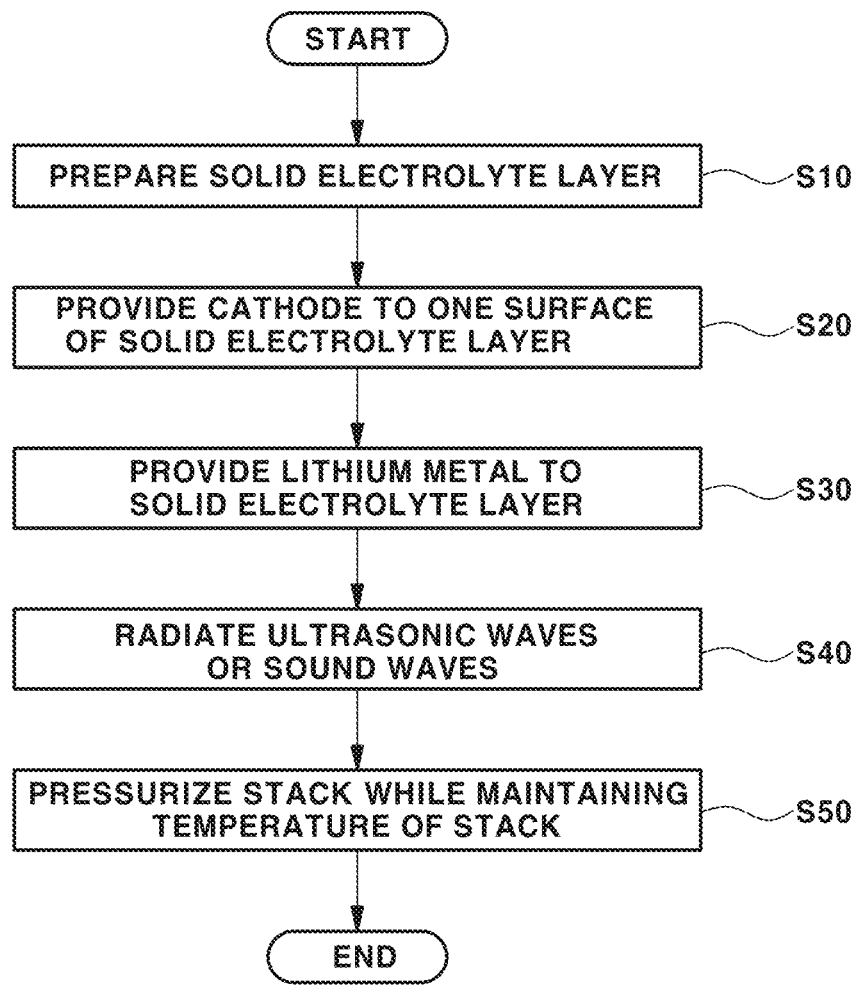
FIG. 6 is a flowchart schematically illustrating a method of manufacturing an all-solid-state battery in accordance with another embodiment of the present invention.

FIG. 6 is a flowchart schematically illustrating a method of manufacturing an all-solid-state battery in accordance with another embodiment of the present invention. Referring to this figure, the all-solid-state battery manufacturing method may further include applying pressure of 10 MPa to 200 MPa to the stack in the thickness direction of the stack while maintaining the temperature of the stack at 25° C. to 100° C. (Operation S50), after radiating the ultrasonic waves or the sound waves to the stack (Operation S40).

As described above, embodiments of the present invention relate to a method of manufacturing an all-solid-state battery in which ultrasonic waves or sound waves are radiated to form a uniform interface between lithium metal and a solid electrolyte layer, and the present invention will be described in more detail through the following example. The following example is only for enhancement of understanding of the invention and are not intended to limit the scope of the invention.

EXAMPLE (S10) A solid electrolyte layer including a sulfide-based solid electrolyte was prepared.

(S20) A cathode including a cathode active material, a conductive material and a solid electrolyte was prepared and provided to one surface of the solid electrolyte layer, and was pressurized.

(S30) A lithium foil was provided to the other surface of the solid electrolyte layer and thus produced a stack.

(S40) The stack was inserted into a pouch, as shown in FIG. 3, and ultrasonic wave generators were located at the outside of the pouch. The ultrasonic wave generators radiated ultrasonic waves having a frequency of about 25 kHz to the stack for about 30 seconds and then paused radiation of the ultrasonic waves for about 30 seconds. Radiation of the ultrasonic waves and pause of radiation of the ultrasonic waves were repeated 5 times, thus completing manufacture of an all-solid-state battery. During radiation of the ultrasonic waves, the stack maintained a temperature of about 100° C. and was pressurized at a pressure of about 20 MPa.

Comparative Example 1

An all-solid-state battery was manufactured by the heating and pressurizing method. First, a stack was acquired through the same method as in the above example.

The stack was inserted into a pouch, and the all-solid-state battery was manufactured by heating the stack to a temperature of about 150° C. and pressurizing the stack at a pressure of about 200 MPa.

Comparative Example 2

An all-solid-state battery was prepared through the same method as in comparative example 1 except that the stack was heated to a temperature of about 150° C. and pressurized at a pressure of about 450 MPa.

Test Example

Interfaces between the lithium metals and the solid electrolyte layers of the all-solid-state batteries according to the example, comparative example 1 and comparative example 2 were analyzed using scanning electron microscopy (SEM). Analysis results were described with reference to FIGS. 7A, 7B, 8A, 8B, 9A and 9B.

Figure 7A:
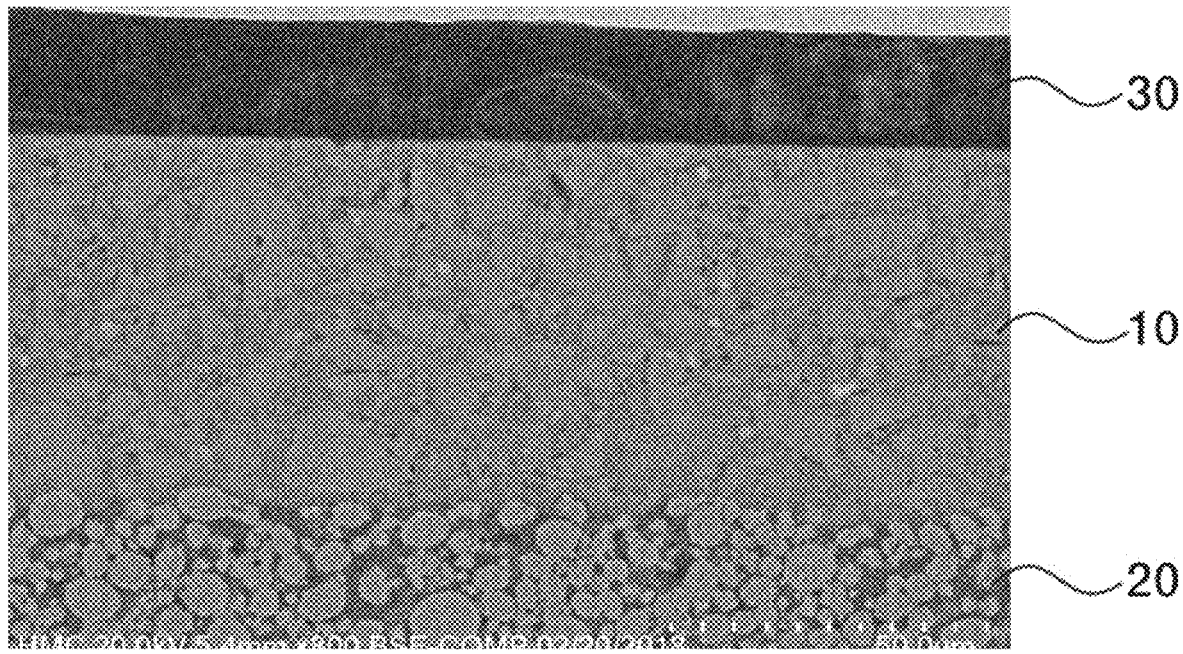
FIG. 7A is a photograph showing scanning electron microscopy (SEM) analysis results of a stack of an all-solid-state battery in accordance with an example.
Figure 7B:
FIG. 7B is an enlarged photograph showing an interface between lithium metal and a solid electrolyte layer.

FIG. 7A is a photograph showing scanning electron microscopy (SEM) analysis results of the stack of the all-solid-state battery in accordance with the example, and FIG. 7B is an enlarged photograph showing an interface between the lithium metal and the solid electrolyte layer.

Figure 8A:
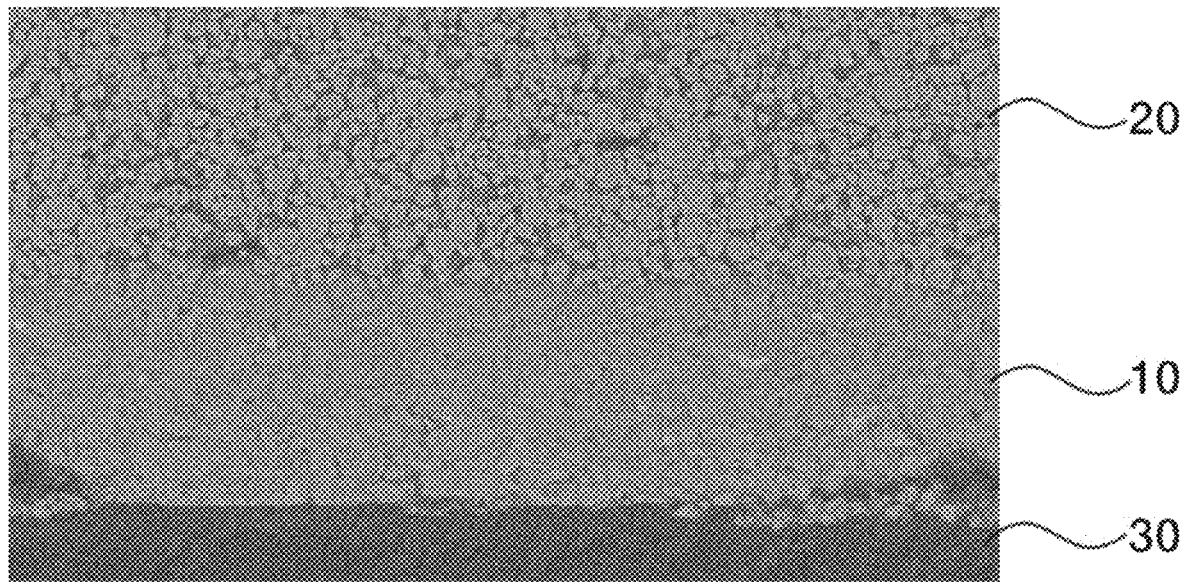
FIG. 8A is a photograph showing SEM analysis results of a stack of an all-solid-state battery in accordance with comparative example 1.
Figure 8B:
FIG. 8B is an enlarged photograph showing an interface between lithium metal and a solid electrolyte layer.

FIG. 8A is a photograph showing SEM analysis results of the stack of the all-solid-state battery in accordance with comparative example 1, and FIG. 8B is an enlarged photograph showing an interface between the lithium metal and the solid electrolyte layer.

Figure 9A:
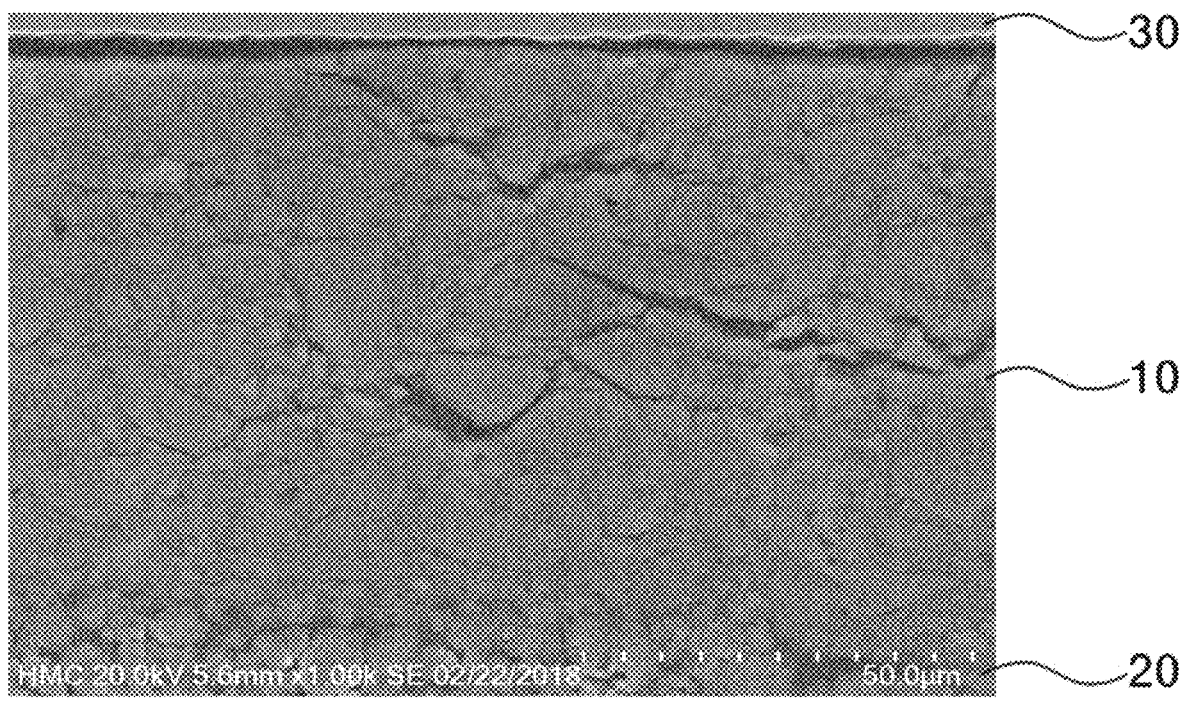
FIG. 9A is a photograph showing SEM analysis results of a stack of an all-solid-state battery in accordance with comparative example 2.
Figure 9B:
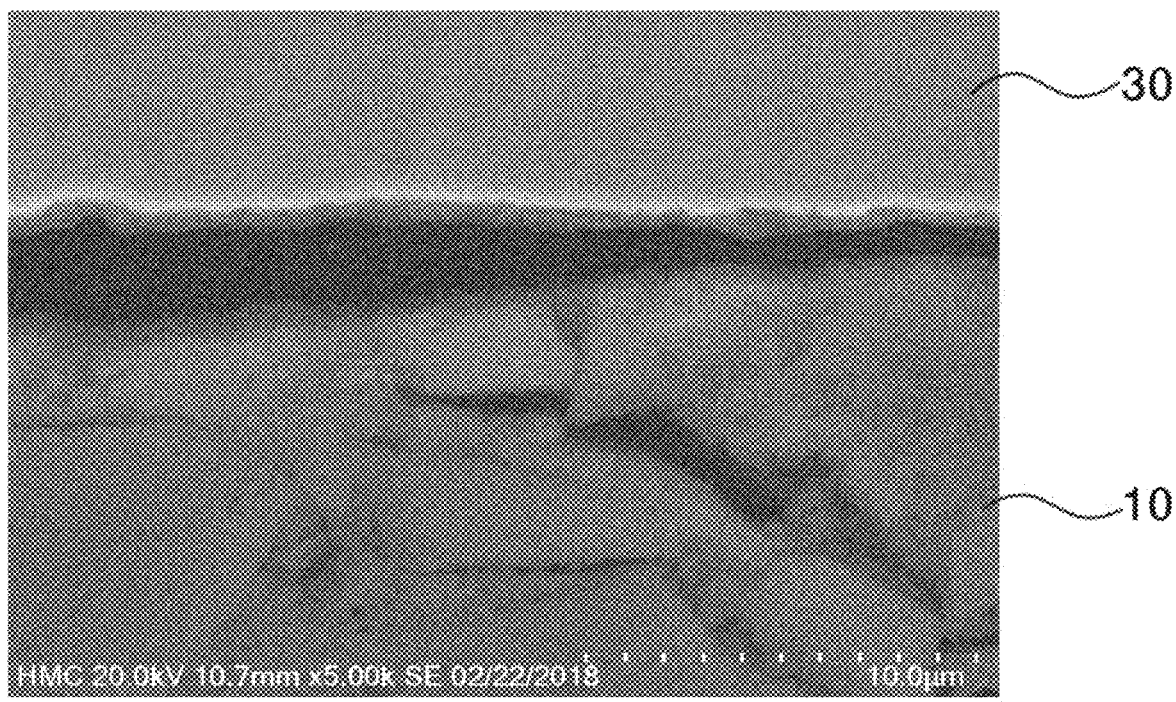
FIG. 9B is an enlarged photograph showing an interface between lithium metal and a solid electrolyte layer.

FIG. 9A is a photograph showing SEM analysis results of the stack of the all-solid-state battery in accordance with comparative example 2, and FIG. 9B is an enlarged photograph showing an interface between the lithium metal and the solid electrolyte layer.

Referring to FIGS. 8A and 8B, it may be confirmed that, when an all-solid-state battery including an anode formed of lithium metal is manufactured by the heating and pressurizing method, an interface formed between the solid electrolyte layer 10 and the lithium metal 30 may not be uniform.

Referring to FIGS. 9A and 9B, it may be confirmed that, even if the pressure of the heating and pressurizing method is raised, nonuniform bonding between the solid electrolyte layer 10 and the lithium metal 30 may not be solved. Further, when the pressure is excessively raised, the lithium metal 30 is melted and permeates the solid electrolyte layer 10 and, thus, no anode is formed. In this case, electrical short-circuit may occur and thus the all-solid-state battery may not be operated.

Referring to FIGS. 7A and 7B, when an all-solid-state battery in accordance with embodiments of the present invention is manufactured by radiating ultrasonic waves or sound waves, a uniform interface between the solid electrolyte layer 10 and the lithium metal 30 may be formed.

As is apparent from the above description, in a method of manufacturing an all-solid-state battery in accordance with embodiments of the present invention, a uniform interface between an anode formed of lithium metal and a solid electrolyte layer may be formed. Therefore, lowering of charging and discharging efficiency due to nonuniformity in the thickness of the anode during charging and discharging may be prevented.

Further, the lithium metal is applied as the anode and, thus, a volume energy density and a weight energy density of the all-solid-state battery may be greatly increased.

In addition, formation of dendrites during charging and discharging may be suppressed and, thus, occurrence of short-circuit and lowering of durability may be prevented.

Moreover, a large-area all-solid-state battery having excellent quality may be manufactured at low cost in a short period of time.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing an all-solid-state battery, comprising:
   preparing a solid electrolyte layer;
   placing lithium metal over a surface of the solid electrolyte layer to prepare a stack; and
   radiating ultrasonic waves or sound waves to the stack.

2. The method of claim 1, wherein the solid electrolyte layer comprises a sulfide-based solid electrolyte.

3. The method of claim 1, further comprising providing a cathode to another surface of the solid electrolyte layer facing away from the surface over which the lithium metal is placed, prior to the providing the lithium metal.

4. The method of claim 3, wherein, in the providing the cathode, the cathode and the solid electrolyte layer are stacked and then pressurized.

5. The method of claim 1, wherein the lithium metal is a lithium foil.

6. The method of claim 1, wherein ultrasonic wave generators or sound wave generators are provided at the outside of the stack and radiate the ultrasonic waves or the sound waves to the stack.

7. The method of claim 6, wherein the ultrasonic wave generators or the sound wave generators are provided to the entirety or some regions of the outer surface of the stack.

8. The method of claim 1, wherein the stack is inserted into a pouch and then the ultrasonic waves or the sound waves are radiated to the stack.

9. The method of claim 8, wherein the stack is inserted into the pouch such that the entirety or some regions of the outer surface of the stack contact the inner surface of the pouch.

10. The method of claim 8, wherein ultrasonic wave generators or sound wave generators are provided at the outside of the pouch and radiate the ultrasonic waves or the sound waves to the stack.

11. The method of claim 10, wherein the ultrasonic wave generators or the sound wave generators are provided to the entirety or some regions of the outer surface of the pouch.

12. The method of claim 1, wherein, in the radiating the ultrasonic waves or the sound waves to the stack, the ultrasonic waves or the sound waves having a frequency of 20 kHz to 40 kHz are radiated to the stack for 1 minutes to 10 minutes.

13. The method of claim 12, wherein the radiating the ultrasonic waves or the sound waves to the stack comprises:
   radiating the ultrasonic waves or the sound waves to the stack for 10 seconds to 30 seconds; and
   pausing radiation of the ultrasonic waves or the sound waves to the stack for 10 seconds to 30 seconds,
   wherein the radiating the ultrasonic waves or the sound waves to the stack and the pausing radiation of the ultrasonic waves or the sound waves to the stack are repeated 5 to 10 times.

14. The method of claim 1, wherein, in the radiating the ultrasonic waves or the sound waves to the stack, the ultrasonic waves or the sound waves are radiated to the stack while pressurizing the stack at a pressure of 10 MPa to 200 MPa in a thickness direction of the stack.

15. The method of claim 1, wherein, in the radiating the ultrasonic waves or the sound waves to the stack, the ultrasonic waves or the sound waves are radiated to the stack while maintaining the stack at a temperature of 25° C. to 100° C.

16. The method of claim 1, further comprising pressurizing the stack at a pressure of 10 MPa to 200 MPa in a thickness direction of the stack while maintaining the stack at a temperature of 25° C. to 100° C., after the radiating the ultrasonic waves or the sound waves to the stack.

* * * * *